July 12, 1949. W. C. BUTTNER 2,475,816
GAS DISPENSING SYSTEM
Filed March 6, 1944

INVENTOR.
William C. Buttner
BY
HIS ATTORNEY

Patented July 12, 1949

2,475,816

UNITED STATES PATENT OFFICE 2,475,816

GAS DISPENSING SYSTEM

William C. Buttner, Winnetka, Ill., assignor to The Bastian-Blessing Company, Chicago, Ill., a corporation of Illinois Application March 6, 1944, Serial No. 525,252

11 Claims. (Cl. 62—1)

The present invention relates to liquefied petroleum gas equipment and more particularly to an improved method and apparatus for vaporizing and dispensing liquefied petroleum gas as a fuel for domestic use.

The petroleum product employed in the system with which the present invention is concerned is preferably a hydrocarbon fuel of the paraffin series, such as commercial butane, butane and mixtures of butane and propane, which fuel is referred to herein and in the trade as a liquefied petroleum gas and has a boiling point below the freezing point of water and is preferably stored in an underground tank in both its liquid and vapor phases. The underground tank is generally disposed below the frost line of the ground for the particular locality and the temperatures experienced at this point maintain a vapor pressure in the tank above atmospheric pressure to serve as a working pressure for the system for educting fuel either in its liquid or vapor phase, or both.

In most domestic installations the fuel is used in its vapor phase at a pressure of approximately eleven inches of water column. This requires a conversion of liquid fuel to its vapor phase and the reduction and regulation of the pressure upon the fuel gas. One way of vaporizing the liquefied gas is the so-called "batch" vaporization system in which vaporization is carried on in the storage tank and vapor is withdrawn in the form of gas from the tank after which the pressure is regulated to the desired amount. The other way of vaporizing the liquefied gas is the so-called "flash" vaporization system in which the liquefied gas is withdrawn as a liquid and passed through a pressure reducer to cause the liquid to flash into vapor. In both instances latent heat of vaporization must be supplied. In the "batch" system the heat is supplied through the liquid in the tank, whereas in the "flash" system the heat is supplied at or beyond the pressure reducer. The latent heat of vaporization in either instance may be heat drawn from the earth or an arificial supply such as a water heater.

There are certain drawbacks to both of these systems, particularly where mixtures of butane and propane are stored. With the batch system the vapor is withdrawn from the top of the tank and replaced by ebullition of the fuel present in its liquid phase. Under these circumstances the propane component having the lower boiling point will tend to evaporate or boil off more rapidly than the butane and the resulting vapor dispensed will have a higher percentage of propane therein than in the liquid fuel. Propane has a lower B. t. u. content than butane and with a reduction in the B. t. u. content of the gas dispensed, the flame at the burner has the objectionable tendency to float away from the burner port. Furthermore, the working pressure is starved by the loss of the propane component and heavier ends are left in the tank to be contended with.

On the other hand, with the flash system the problem is present of being able to supply a localized high input of heat required for the latent heat of vaporization at or beyond the point of initial pressure reduction and to release liquid into the service line encounters the danger of liquid going beyond the last pressure control where it will reach the burners or ultimately vaporize and create a pressure much higher than the rated service pressure at the appliance.

Dispensing systems have heretofore been contrived which combine certain advantages of these two systems, one supplementing the other to take care of different conditions to which the system is subjected, including temperature changes of the atmosphere and of the ground, but such systems have experienced difficulty with liquid reaching the service conduit beyond the last or service stage pressure reducer to cause high pressure at the appliance or are so arranged that liquid fuel traps itself under conditions that the hydraulic expansion of the liquid with a temperature rise develops dangerous hydraulic pressures or opens safety valves to eject liquid dangerously.

The present invention is an improved system which remedies the difficulties mentioned and obviates the dangers considered without detracting in any way from its function of supplying an appliance safely with a fuel gas of substantially constant B. t. u. content, whether the system is operating essentially as a flash system or as a batch system at any given time.

One of the objects of the invention is to provide an improved dispensing system in which liquid collecting or trapped at a point beyond a flash pressure reducer may be returned to the system instead of wasted through a safety valve.

The invention is also characterized by an arrangement which is capable of utilizing the generally rising temperatures of daytime to maintain operating conditions under heavy service loads in event subterranean heat is depleted locally faster than heat can be conducted through the earth to the region at which vaporization is taking place.

Other and further objects will become apparent from the drawing, the description relating thereto and the appended claims.

Referring now to the drawing.

Figure 1:
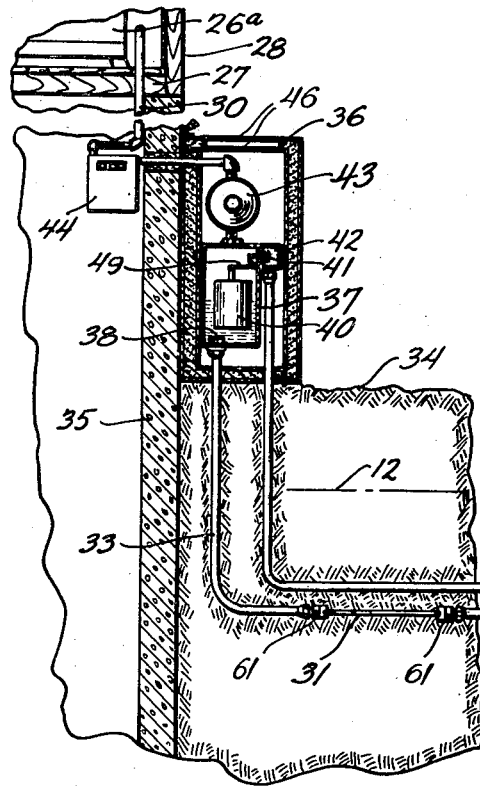
Fig. 1 is a vertical sectional view taken longitudinally through a storage tank and dispensing conduits illustrating the structure and arrangements of the preferred embodiment of the invention with the tank installed and charged with fuel ready for operation.
Figure 4:
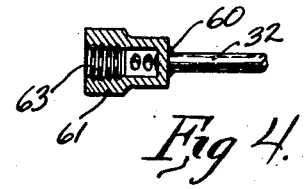
Fig. 4 is a section taken upon line 4—4 of Fig. 3.

Referring now to the drawing in further detail, and particularly to Fig. 1, a pressure tested tank 10 treated to resist corrosion is buried in the ground 11 below the frost line 12 thereof to absorb heat from the earth to warm the liquid fuel 13 which is stored in the tank, such as commercial butane or a mixture including a substantial percentage of propane.

With this arrangement, the heat of the earth is relied upon to boil the liquid and fill the space above the liquid with vapor 19 to establish a vapor pressure in the tank which will serve as a working pressure to force fuel out of the tank in either its liquid state 13 or its vapor phase 19.

The tank 10 is provided with a riser pipe 14 which is welded at its lower end to the tank 10 as at 15 where it is disposed over an opening 16 in the tank. Around the riser pipe 14 a metal casing 17 is provided as secured to the tank 10 in a suitable manner as by spot welds 18, or brackets, which casing extends to a point above the ground where it receives a cover 20 padlocked in place by a lock 20a.

The length of the casing 17 and the riser pipe 14 is determined in relationship to the depth at which the tank is to be buried and the riser pipe 14 is designed to extend upwardly to a point within hand reach from the top of the casing 17 where it is threaded as at 21 to receive a fitting 22 such as that disclosed in the Buttner and Sundstrom application, Serial No. 397,096, dated June 7, 1941, now Patent No. 2,405,998 granted August 20, 1946, reference to which is hereby made. The fitting 22 has a liquid eduction pipe 23 which extends to a point 24 adjacent the bottom of the tank to withdraw liquid forced into the pipe by the vapor pressure of the vapor 19. The liquid eduction pipe 23 leads to a hand controlled outlet valve 24 upon the fitting through an excess flow check valve 29 and into an expansion means such as the first stage pressure reducer 25, which is shown and described in my co-pending application, Serial No. 399,715, dated June 25, 1941, now Patent No. 2,450,824, granted October 5, 1948, reference to which is hereby made. The pressure reducer is set to deliver a pressure of from five to ten pounds.

An appliance, such as a stove 26a, disposed upon the first floor 27 of a house 28, receives fuel from the regulator 25 through a service line which includes a conduit 26 connected to the outlet of the first stage regulator 25, a vaporizing unit 31, a conduit 33, a container 37, a service pressure regulator 43, a meter 44 and a house line 30 connected to the stove 26a.

As the gas is burned in the stove 26a, the pressure at the outlet of the regulator 43 drops below the pressure at which the regulator 43 is set to deliver, namely, about eleven inches of water column, and when the regulator 43 opens to restore the pressure, the pressure drop will be transmitted back through the service line to the regulator 25. Liquid will then flow from the tank 10 through the regulator 25 and into the conduit 26 where, with the absorption of latent heat of vaporization the liquid fuel will vaporize to replenish the fuel burned.

If there is not sufficient heat around the regulator body 25 to supply the latent heat of vaporization, the liquid fuel will move forward to vaporize in warmer elements and exhaust progressively their heat content. In this movement the liquid may move along the pipe 26, which is also buried below the frost line 12, to a vaporizer 31 more particularly shown in Fig. 3 which is made up of a plurality of small copper tubes 32 connected in parallel and spread laterally to engage a substantial area of the earth in heat exchange relationship.

From the vaporizer 31, unvaporized fuel failing to find heat would enter the conduit 33 leading upwardly to a point above the level 34 of the ground and near the foundation 35 supporting the house 28. At this point, an insulated box 36 is provided having therein the container 37 into which the gas from the pipe 33 passes through the bottom and against an inside baffle 38.

A float 40 is supported in the container 37 upon a pivotally mounted arm 49 which controls the operation of a valve 41. The valve 41 is arranged to close in the direction of gas flow into the container from a chamber 42 disposed at one side of the container 37 or, as a corollary, to open under excessive pressures present in the container 37. The weight of the float 40 normally holds the valve 41 closed.

A connection is made to the top of the container 37 by which a second stage or service regulator 43 receives gas from the top of the container 37 and delivers it to the conduit 30 through the meter 44.

The chamber 42 is supplied with vapor 19 from the upper part of the tank 10 by a direct connection 45 in open communication with the top of the tank except for a hand shut-off valve 49 operated at will by a hand wheel 47 inside of the casing 17 and an excess outflow check valve 39. The lowest point in the vapor pipe 45 is the outlet 48 into the tank at the bottom of the check valve 39 and the highest point therein is the chamber 42 so that any liquid reaching the chamber 42 above the valve 41 is free to flow back into the tank 10 through the conduit 45 if not vaporized in the conduit 45.

In operation, whenever gas is being consumed by the stove 26a and other appliances in the building 28, the check valve 41 will be normally closed due to the weight of the float 40 and the pressure in the tank 10 which is effective in the compartment 42. Liquid will be withdrawn through the liquid eduction line 23 through the first stage pressure reducer 25 where it will be vaporized to the extent that the surrounding parts are capable of supplying the latent heat necessary for vaporization. Under heavy withdrawal, if the surrounding parts are depleted of their heat faster than they can absorb more from the earth surrounding them, liquid will move progressively along the service line to vaporize and progressively absorb heat until such time that liquid might, under exceptional conditions, reach the container 37, after which the flow of liquid will contact the float 40 to open the valve 41. Thereafter, vapor will be supplied under a higher pressure from the top of the tank 10 to the top of the container 37. This higher pressure effective on the downstream side of the regulator will back pressure the regulator and close the valve of the regulator 25 to trap the liquid present in the service line.

As long as there is insufficient heat along the service line to vaporize the liquid fuel, the vapor 19 will flow into the container 37 and from there through the second stage pressure regulating valve 43 to replace or supplement vapor derived from the liquid present in the conduit 26.

Under these conditions the liquid in the container 37 will be extremely cold and pressure upon the vapor forced into the container 37 by the tank pressure would be sufficiently high that condensation will take place in the container 37 whenever the system shuts down. With condensation taking place gradually in the container 37, the level of the liquid therein will rise until such time as the level therein might reach the valve 41, after which the system will stabilize itself and liquid begins to run back through the pipe 45, such liquid flowing to the tank through the opening 48 because of the incline in the conduit 45, as when the liquid present in the iontainer 37 begins to expand and vaporize due to absorption of some heat from its environment. The liquid in the container 37 will continue to vaporize under any rising atmospheric temperatures until use of the fuel lowers the level of liquid enough that the float 40 again closes the valve 41. Furthermore, the ground around the conduit 26 and vaporizer 31 will gradually convey heat thereto and cause further vaporization which will lower the level of liquid in the container 37.

From the description had thus far, it will be seen that a system is provided which will stabilize itself under all extreme or unexpected working conditions to which it may be subjected without the danger of liquid reaching the gas stove 25 or a point beyond the service stage regulator 43, and without gas being trapped and wasted.

Spaced heat insulating panes of glass 46 are provided in the top of the container to permit sunlight to warm the interior of the box 36.

Figure 2:
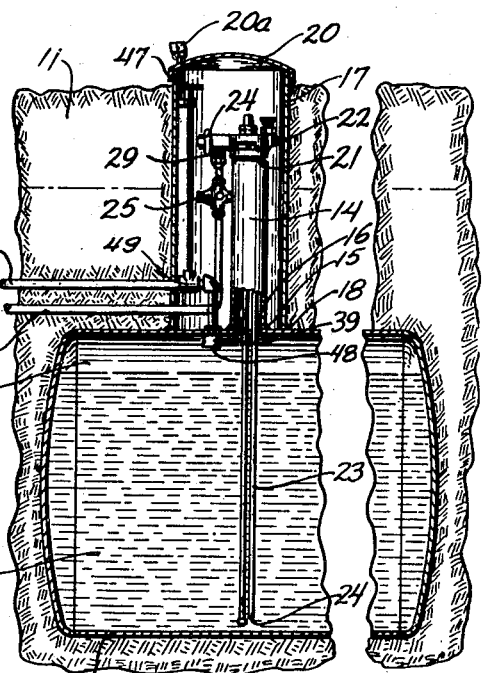
Fig. 2 is an enlarged vertical section illustrating another arrangement of parts contemplated by the invention in combination with the tank disclosed in Fig. 1.
Figure 2:
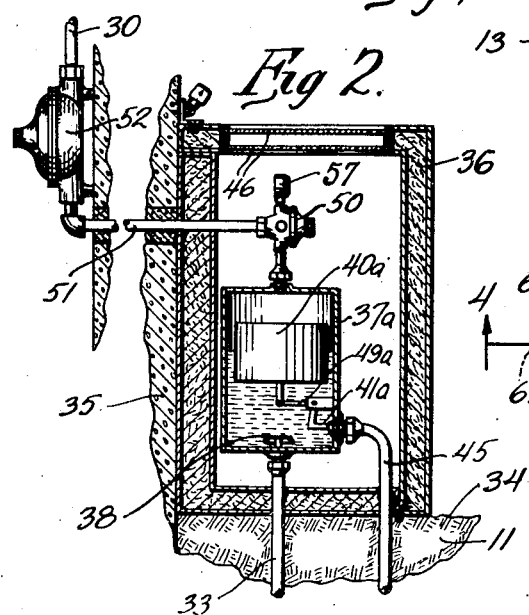

However, with the device just disclosed, some variation will take place in the B. t. u. content since gas supplied through the vapor conduit 45 will have a higher percentage of propane therein than the vapor being supplied by the chilled liquid in the container 36 whenever there is liquid in the chamber 37 sufficient to actuate the float valve 40. To obviate even this possibility where constancy of B. t. u. content is a critical factor, and the mixture has a high percentage of propane in it, a construction is shown in Fig. 2 where substantially the same operation of the system takes place except for the fact that the inlet of the conduit 45 to the chamber 37a is below the level of the liquid therein so that gas supplied to the stove 26 when the float control valve 41a is opened will bubble up through the liquid present in the container 37a and tend to absorb the heavier ends present there to raise the B. t. u. content of the fuel gas delivered to the appliance. A suitable pressure gauge 57 is provided for determining the pressure in the conduit 51. This gauge 57 is connected to the regulator 50 and may be viewed through the glass 46.

With this particular construction, as shown in Fig. 2, there is a possibility that liquid will not flow back into the tank 10 through the conduit 45 because of the movement of gas in the opposite direction therethrough until such time as the liquid level in the container 37a reaches the valve of a second flash pressure reducer 50. When liquid reaches this regulator there will be no substantial flow of vapor from the conduit 45 into the container 37a and this will permit the backflow of liquid in container 37a to the tank through the conduit 45 to take place if any vaporization subsequently takes place in the container 37a.

If, however, over a long period of condensation only liquid reaches the expansion valve 50 then vaporization will take place in the conduit 51 because the regulator 50 in this instance is set to deliver a low pressure such as two or three pounds. Thereafter, the pressure is supplied to the stove 26a at the service stage pressure by the service stage regulator 52 since condensation will have supplied some heat to the liquid in the container 37a.

There is practically no likelihood that liquid would ever reach the level of the regulator because this would denote a load far in excess of even an extreme load for the system and such would be closely akin to a break in the line, under which conditions the excess flow check valves provided in the several lines 26 and 45 would have closed before liquid reached the container 37a. In fact, it is not likely except in extreme cold conditions and heavy withdrawals that liquid would even reach the container 37a, but it is important to provide against the ultimate contingency that might arise which otherwise would permit liquid to get beyond the service stage regulators 43 or 52.

Figure 3:
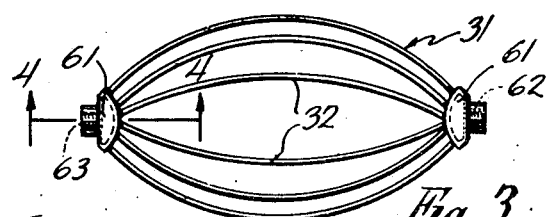
Fig. 3 is a plan view of the vaporizer shown in Fig. 1.

Referring to Fig. 3, the vaporizer is made up of a plurality of bent tubes 32 spread fanwise and silver soldered as at 60 to the manifolds 61 provided at both ends, one threaded as at 62 for an inlet connection to the pipe 26 and the other end threaded as at 63 for outlet connection with the pipe 33. The fanlike spread of the pipes 32 is such as to render immediately effective a large area of the earth for the supply of latent heat of vaporization.

Having thus described the invention, it will be readily apparent that various changes and modifications can be made including supplying artificial heat to the container 37 if desired from a source inside the house, without departing from the spirit of the invention, the scope of which is commensurate with the appended claims.

What is claimed is:

1. In a system for dispensing liquefied petroleum fuel the combination of a storage tank for fuel buried in the ground to absorb earth heat to develop a supply of fuel vapor in the tank and to provide thereby a working pressure, a fuel receiving container means, means for connecting the container means with the top of the storage tank, a valve controlling the flow of fuel vapor from the tank to the container means, a liquid level responsive means in the container means operating said valve to open same when liquid is present in the container means above a predetermined level and permit liquid to flow to the tank from the container means, conduit means connecting the container means to a point below the level of liquid in the tank including a pressure reducer and a vaporizer, and a service line leading from the upper portion of the container means to a domestic appliance including a service stage pressure regulator.

2. In a liquefied gas dispensing system for handling fuel mixtures of butane and propane, the combination of a storage tank for said fuel mixtures buried in the ground to absorb earth heat to develop a supply of vapor in the tank and provide a working pressure, a container spaced from the tank, conduit means connecting the container with the top of the storage tank, a valve controlling the flow of vapor fuel from the tank to the container, a liquid level responsive device in the container for operating said valve to open same when liquid is present in the container above a predetermined level, conduit means connected with said container for educting liquid fuel from the tank including a pressure reducer, and a service line leading from the upper portion of the container to a domestic appliance including a service stage pressure regulator.

3. The combination called for in claim 2 in which the conduit means connecting the container to the top of the storage tank is connected to the container at a point below the level of liquid therein at which said liquid level responsive means is actuated to open the valve.

4. The combination called for in claim 2 in which the conduit means connecting the container to the top of the storage tank includes an excess flow check valve closing in the direction of flow from the storage tank.

5. The combination called for in claim 2 in which the service line leading from the upper portion of the container includes an expansion valve ahead of the service stage pressure regulator.

6. In a liquefied gas system for dispensing fuel mixtures having substantial amounts of propane therein, the combination of a storage tank buried in the ground to absorb earth heat therefrom, a container spaced from the tank, means for connecting the container with the top of the storage tank, a valve controlling the flow of vapor fuel from the tank to the container, a float in the container operating said valve to open same when liquid is present in the container above a predetermined level, conduit means connecting the container to the bottom of said storage tank including a pressure reducer, and a service line leading from the upper portion of the container to a domestic appliance including a service stage pressure regulator.

7. A gas dispensing device of the class described including a service conduit leading from a source of liquefied gas present in its liquid phase and a second service conduit leading from a source of fuel gas present in its vapor phase, means for vaporizing liquefied gas present in the first mentioned service conduit, means for receiving fuel from both conduit means in vapor form, means for controlling the flow of fuel into said receiving means from said second means in relation to the amount of liquid present in said first conduit means, and means for reducing the pressure of fuel flowing from said receiving means to a point of use.

8. A safety device for a gas dispensing system of the class described including a container adapted to be connected to a service conduit leading from a source of liquefied gas present in its liquid phase and a second service conduit leading from a source of gas present in its vapor phase, means for controlling the flow of fuel into said container from said source of gas present in its vapor phase in relation to the amount of liquid present in said container including a valve, and means carried by said container for reducing the pressure of fuel flowing from said receiving means to a point of use.

9. In a liquefied gas dispensing system, the combination of a storage tank buried underground for storing a supply of liquefied gas in heat exchange relationship with the earth, a container spaced from the tank, a heat insulating covering for the container including an element admitting sunlight to the container, means connecting the container to the storage tank at a point adjacent the bottom of the tank including a pressure reducer, and conduit means connecting the top of the container with a device consuming gas including a service pressure regulator.

10. In a liquefied gas dispensing system, the combination of a storage tank buried underground for storing a supply of liquefied gas in heat exchange relationship with the earth, a container spaced from the tank, means for placing the container in open communication with the top of the tank when liquid in said container exceeds a predetermined level, a heat insulating covering for the container including an element admitting sunlight to the container, means connecting the container to the storage tank at a point adjacent the bottom of the tank including a pressure reducer, and conduit means connecting the top of the container with a device consuming gas including a service pressure regulator.

11. In a liquefied gas dispensing system for handling fuel mixtures having substantial amounts of propane stored in a storage tank buried in the ground to absorb earth heat and develop a supply of vapor in the tank to provide a working pressure, the combination of a container spaced from the tank, means for connecting the container with the top of the storage tank, means for controlling the flow of vapor fuel from the tank to the container including a liquid level responsive device responsive to the level of liquid present in the container, conduit means connecting the container to the tank at a point adjacent the bottom of the tank including a pressure reducer, and a service line leading from the upper portion of the container to a domestic appliance including a service stage pressure regulator.

WILLIAM C. BUTTNER.

REFERENCES CITED

The following references are of record in the file of this patent:

UNITED STATES PATENTS

| Number | Name | Date |
|---|---|---|
| 2,190,366 | Mead | Feb. 13, 1940 |
| 2,233,508 | Baird et al. | Mar. 4, 1941 |
| 2,255,747 | Jones | Sept. 16, 1941 |
| 2,314,279 | Jones | Mar. 16, 1943 |
| 2,371,231 | Duff | Mar. 13, 1945 |